(12) United States Patent
Curtin et al.

(10) Patent No.: US 7,305,644 B2
(45) Date of Patent: Dec. 4, 2007

(54) NEGATIVE SLACK RECOVERABILITY FACTOR—A NET WEIGHT TO ENHANCE TIMING CLOSURE BEHAVIOR

(75) Inventors: James J. Curtin, Fishkill, NY (US); Kevin M. McIlvain, Cold Spring, NY (US); Ray Raphy, Poughkeepsie, NY (US); Douglas S. Search, Red Hook, NY (US); Stephen Szulewski, Newburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 11/129,785

(22) Filed: May 16, 2005

(65) Prior Publication Data

US 2006/0015836 A1    Jan. 19, 2006

Related U.S. Application Data

(63) Continuation-in-part of application No. 10/890,463, filed on Jul. 12, 2004, now Pat. No. 7,120,888.

(51) Int. Cl.
*G06F 17/50* (2006.01)
*G06F 9/45* (2006.01)

(52) U.S. Cl. ............................. 716/10; 716/6
(58) Field of Classification Search .................. 716/6, 716/10
See application file for complete search history.

(56) References Cited

U.S. PATENT DOCUMENTS 6,233,724 B1 *  5/2001  LaBerge ...................... 716/18
7,149,992 B2 * 12/2006  Chang et al. .................. 716/6
2003/0159118 A1 * 8/2003  Lindkvist ........................ 716/5
2004/0199879 A1 * 10/2004  Bradfield et al. ............... 716/1
2005/0022145 A1 * 1/2005  Tetelbaum et al. .............. 716/6
2005/0034091 A1 * 2/2005  Harn ............................. 716/6
2005/0120319 A1 * 6/2005  van Ginneken ................ 716/6
2005/0183055 A1 * 8/2005  Herrera ........................ 716/17

* cited by examiner

*Primary Examiner*—Stacy Whitmore
*Assistant Examiner*—Magid Y. Dimyan
(74) *Attorney, Agent, or Firm*—Lynn L. Augspurger

(57) ABSTRACT

More "timing closure efficient" Timing Driven Placements by implementing our new net weight for negative slack paths to enhance timing closure behavior is provided by a NSRF (Negative Slack Recover Factor). This new weight would not be based on the absolute amount of negative slack in a path, but rather it would be based on the proportion or percentage of the path's total net delay adder that must be recovered in order to achieve timing closure (zero slack). After an initial or previous placement has been created, then a list of paths with timing violations with a Negative Slack Recover Factor (NSRF) is created for each net in each of the timing paths on the list of paths, and then calculating a NSRF net weight factor for use in subsequent placements and also assigning nets in the list of paths with no timing violations a NSRF default value of one. The NSRF value is calculated as equaling (ZWLM slack value+negative slack value)/ZWLM slack value=(1+(negative slack value/ZWLM slack value)), where ZWLM is a Zero Wire Load Model (ZWLM) value of timing wherein all wire parasitics are removed from consideration in the timing.

16 Claims, 6 Drawing Sheets

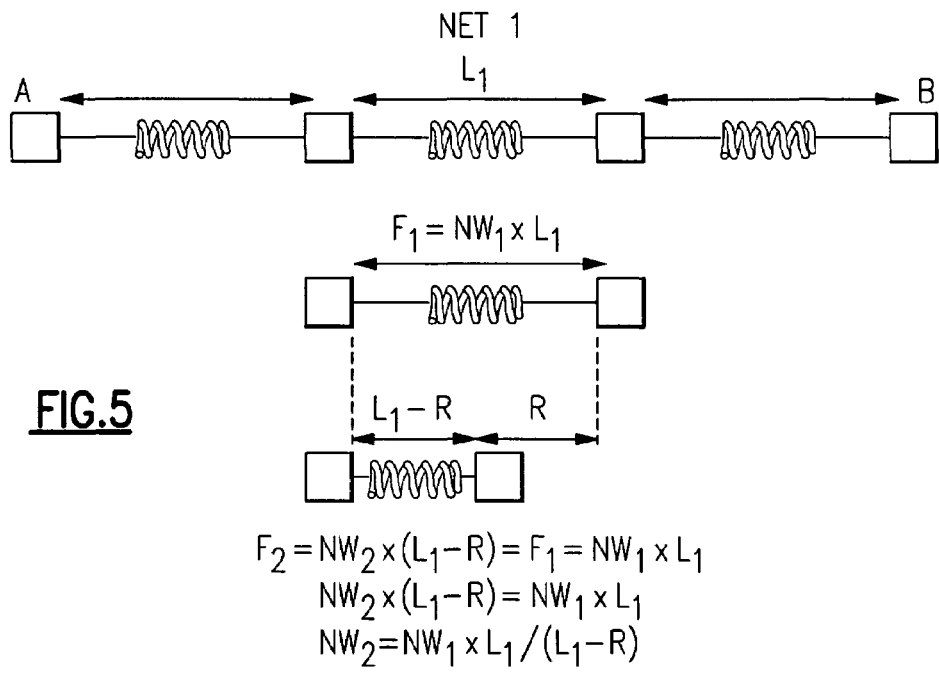

FIG.5

SET THE FORCE ON NET 1 FOR THE ACTUAL POST INITIAL PLACEMENT RESULT, EQUAL TO THE FORCE FOR THE PLANNED POST TDP PLACEMENT RESULT

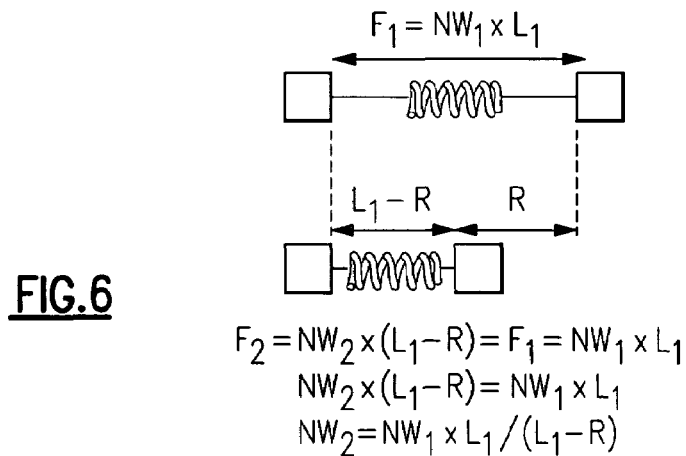

FIG.6

$$F_2 = NW_2 \times (L_1 - R) = F_1 = NW_1 \times L_1$$
$$NW_2 \times (L_1 - R) = NW_1 \times L_1$$
$$NW_2 = NW_1 \times L_1 / (L_1 - R)$$

IF PATH TIME DELAY IS APPROXIMATELY LINEARLY RELATED TO PATH CUMULATIVE NET LENGTH, THEN THE EQUATION FOR $NW_2$ CAN BE REWRITTEN $$L_1 \Longrightarrow f \text{ (ZWLM slack + negative slack)}$$
$$R \Longrightarrow f \text{ (negative slack)}$$
$$L_1 - R \Longrightarrow f \text{ (ZWLM + neg slk − neg slk)}$$

$$NW_2 = NW_1 \times L_1/(L_1-R)$$

BUT:
$L_1 \Longrightarrow f$ (ZWLM slack + negative slack)
$R \Longrightarrow f$ (negative slack)
$L_1 - R \Longrightarrow f$ (ZWLM + neg slk − neg slk)

SO:
$$NW_2 = NW_1 \times L_1/(L_1-R)$$
$$NW_2 = NW_1 \times \frac{(\text{ZWLM slack} + \text{negative slack})}{(\text{ZWLM slack} + \text{negative slack} - \text{negative slack})}$$

THEREFORE:
$$NW_2 = NW_1 \times NSRF$$

WHERE:
$$NSRF = \frac{(\text{ZWLM slack} + \text{negative slack})}{(\text{ZWLM slack})}$$

FIG.7

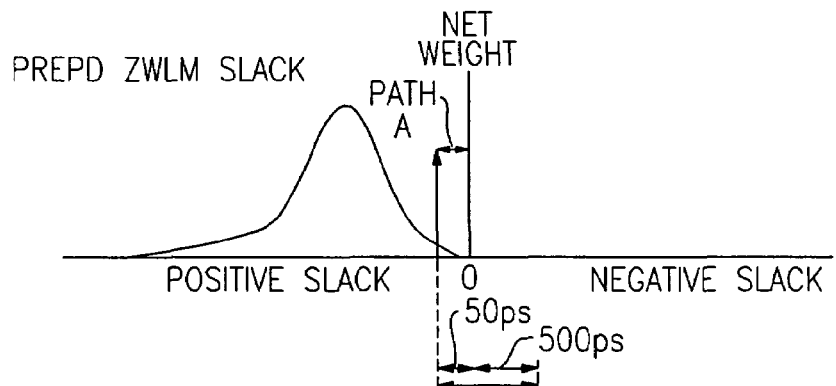

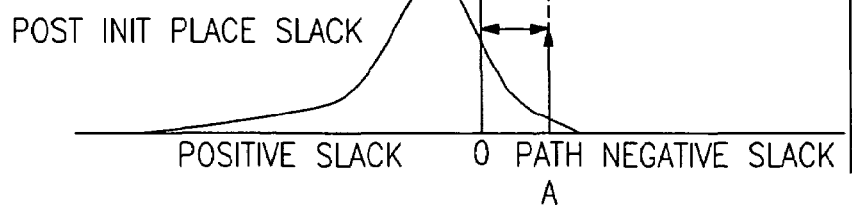

FIG.8

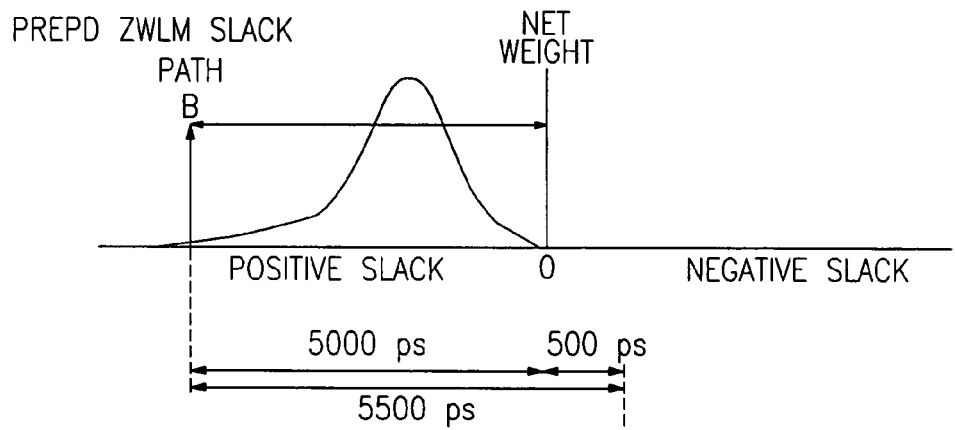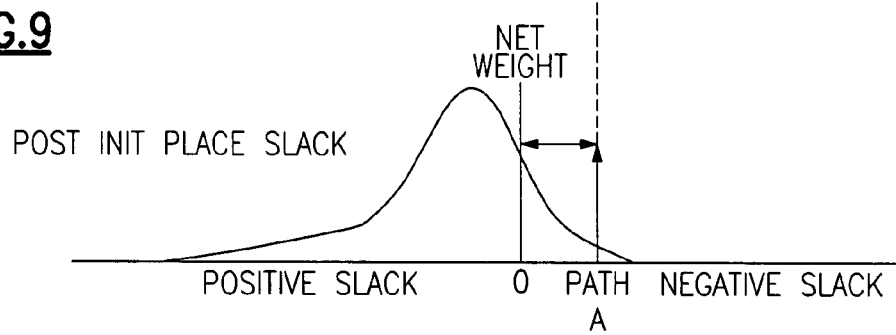
FIG.9
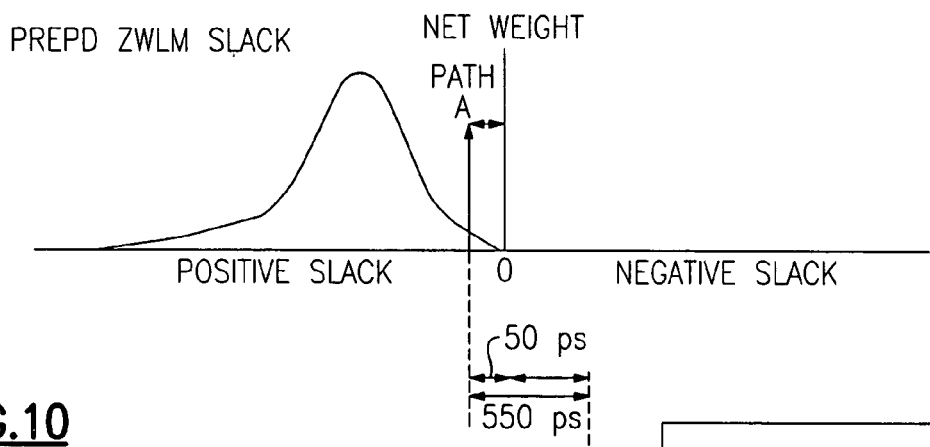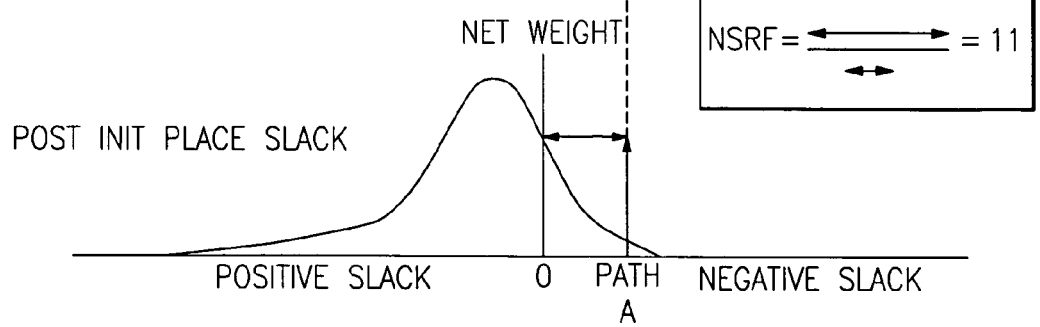
FIG.10

NEGATIVE SLACK RECOVERABILITY FACTOR—A NET WEIGHT TO ENHANCE TIMING CLOSURE BEHAVIOR

CROSS-REFERENCE TO RELATED APPLICATIONS

This application is a continuation in part of U.S. Ser. No. 10/890,463, filed Jul. 12, 2004, now U.S. Pat. No. 7,120,888 and entitled "Method System and Storage Medium for Determining Circuit Placement" by James Curtin et. al., and contains subject matter which is related to the subject matter of the following co-pending applications, each of which is assigned to the same assignee as this application, International Business Machines Corporation of Armonk, N.Y. Each of the below listed applications is hereby incorporated herein by reference in its entirety;

U.S. Ser. No. 11/129,784 filed concurrently herewith and entitled "Genie: A method for classification and graphical display of negative slack timing test failures"

U.S. Ser. No. 11/129,785 filed concurrently herewith and entitled "A method for netlist path characteristics extraction"

TRADEMARKS

IBM® is a registered trademark of International Business Machines Corporation, Armonk, N.Y., U.S.A. and other names used herein may be registered trademarks, trademarks or product names of International Business Machines Corporation or other companies.

BACKGROUND OF THE INVENTION

Field of the Invention

This invention relates to integrated circuit design and particularly to timing closure on a semiconductor chip design.

DESCRIPTION OF BACKGROUND

As computer system speeds have steadily increased, semiconductor chip designs have been subject to a correspondingly stringent constraint set for on-chip timing requirements. Higher frequencies and reduced cycle times have put a premium on completing all timing path operations within shorter periods of time. At the same time semiconductor technologies have implemented advanced photolithographic techniques in order to promote lower power, faster switching speeds, and smaller area consumption. One of the consequences of these advancements has been an increased parasitic loading associated with the circuit interconnect structure—amplifying the contribution of the interconnect delay to the overall timing path delay problem. While the interconnect delay contribution is based on a number of design characteristics; the principal factor is circuit placement.

To achieve timing closure on a semiconductor chip design, an attempt is made to correct or improve timing path delay violations by directing placement behavior to reduce interconnect delays for these timing violation paths through improved placements. Initial circuit placement results are translated into timing path delay values. Timing paths whose delay values exceed the timing target are deemed timing violations, and are addressed by creating placement priorities for them in a subsequent placement. These placement priorities are implemented in a mechanism known as net weighting. Net weight values affect placement behavior by emphasizing a shortening of placement distances between the circuits connected by the 'net weighted' interconnect element.

Before our invention in a method currently used before our invention initial placement results are translated into timing path values. Timing path delay violations are identified, and all nets associated with these timing path delay violations are given an elevated net weight to encourage a reduction of these net lengths and a consequent improvement in their associated path delays in subsequent placements. This method is discussed and further explained in the description of our invention; however, we have learned that drawbacks of the current method are considerable.

Establishing a linear relationship used in the current method between the amount of negative slack in a path and the magnitude of the net weight assigned to its nets is based on the supposition that the greater the negative slack for a path, the greater the placement change required to achieve timing closure; and therefore the greater the net weight required to drive a placement solution that will achieve that timing closure. This presumed correlation between negative slack magnitude and the placement change required to achieve timing closure is not necessarily accurate for today's quadratic algorithm placement solutions.

SUMMARY OF THE INVENTION

The shortcomings of the prior art are overcome and additional advantages are provided through our Negative Slack Recoverability Factor used as a net weight to enhance timing closure behavior to provide a more timing closure efficient timing driven placement of nets in a chip design.

Additional features and advantages are realized through the techniques of the present invention described in the detailed explanation below. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 introduces our new force Net Weight Initial Placement-Equilibrium point.

FIG. 6 illustrates setting the force on Net1 for the actual post Initial Placement result equal to the force for the planned post timing driven placement result.

FIG. 7 illustrates how the equation for the new net weight reduces to $NW_2=NW_1$(Total path net delay/Total path net delay−negative slack value) so $NW_2=NW_1$(ZWLM slack value+negative slack value)/(ZWLM slack value+negative slack value−negative slack value) as used in the preferred embodiment of our invention.

FIG. 8 shows a Path A or first path which has a pre-placement ZWLM slack of +50 ps.

FIG. 9 shows another Path B or path 2 having a pre-placement ZWLM slack of +5000 ps.

The FIG. 10 shows the NSRF netweight for path A must be set for recovery of 90% of its net delay adder to 11, while

The detailed description explains the preferred embodiments of the invention, together with advantages and features, by way of example with reference to the drawings.

DETAILED DESCRIPTION OF THE INVENTION

Figure 1:
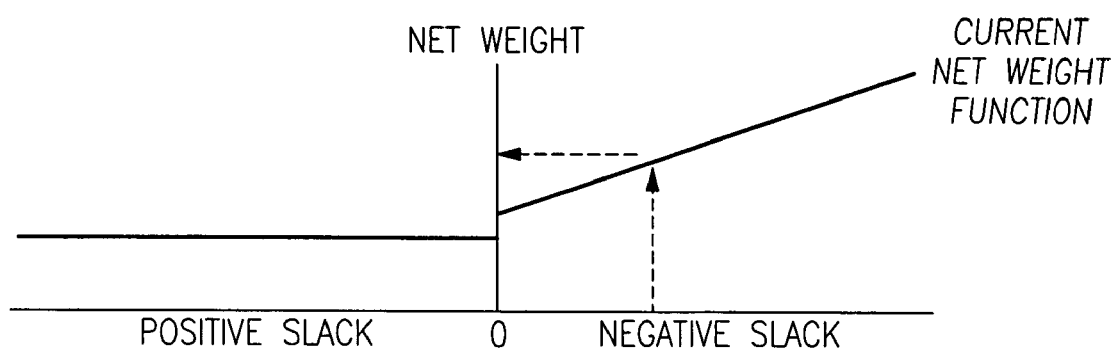
FIG. 1 illustrates one example of the current method which we describe for the Negative Slack Netweight Function (NSNF).

Turning now to more detail one can refer to FIG. 1 showing the current method. In this current method the timing violation values (a.k.a. negative slack values) are mapped into net weights in the following way. A linear function relationship is established between the amount of negative slack in a path and the magnitude of the net weight assigned to each net in that path (FIG. 1). The greater the negative slack for a path, the larger the magnitude of the net weight assigned to that path's nets [NW=C (negative slack) where C is a constant multiplier and is the slope of the linear function relating negative slack to net weight values].

Figure 2:
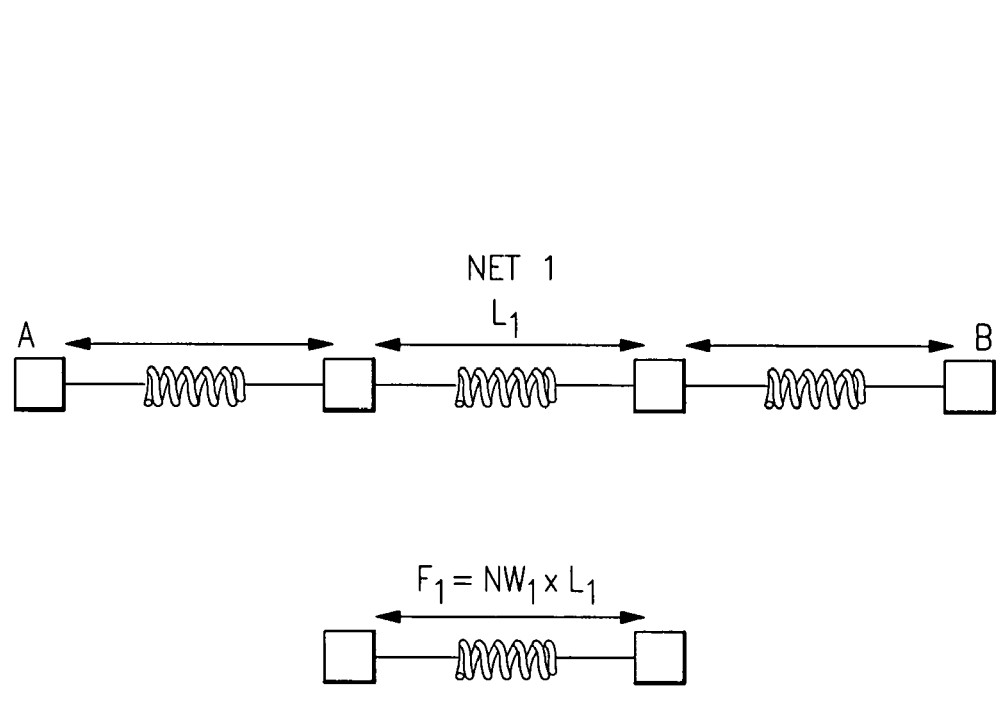
FIG. 2 illustrates the Initial Placement-Equilibrium point for Net1.

Drawbacks of this approach of placements achieved by Quadratic (Total Length Squared Minimization) placement algorithms arose when the placements represent equilibrium point solutions for those functions. At these minimization points the first derivative of the quadratic function (L squared—where L equals the interconnect length connecting circuits in a net) is set to zero. Thus the so-called 'forces' (kL) are all in equilibrium. Where the k values are net weights (NW). FIG. 2 illustrates the Initial Placement-Equilibrium point for Net1.

Figure 3:
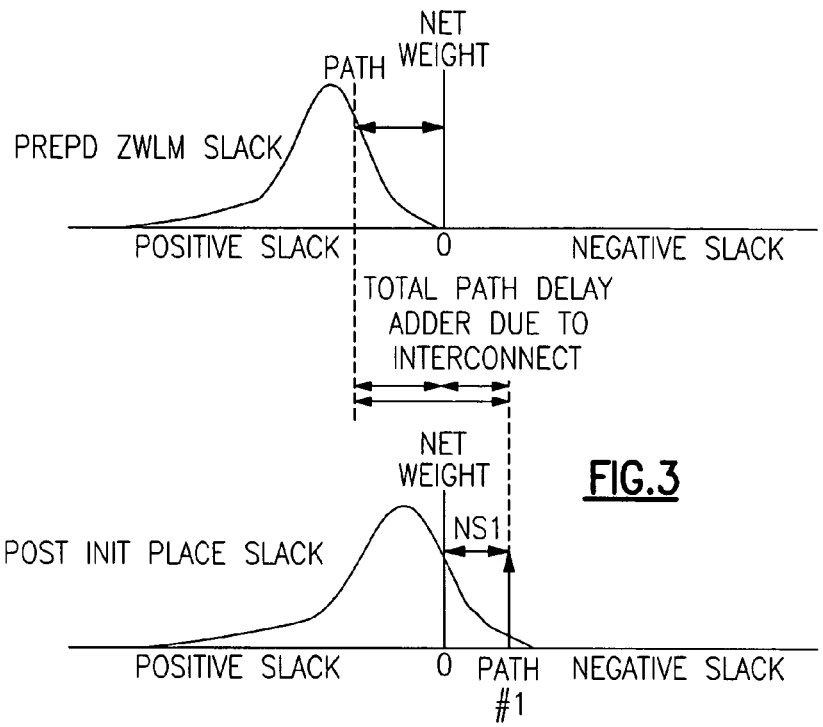
FIG. 3 illustrates a placement path slack before the introduction of the Zero Wire Load Model (ZWLM) slack concept is employed.
Figure 4:
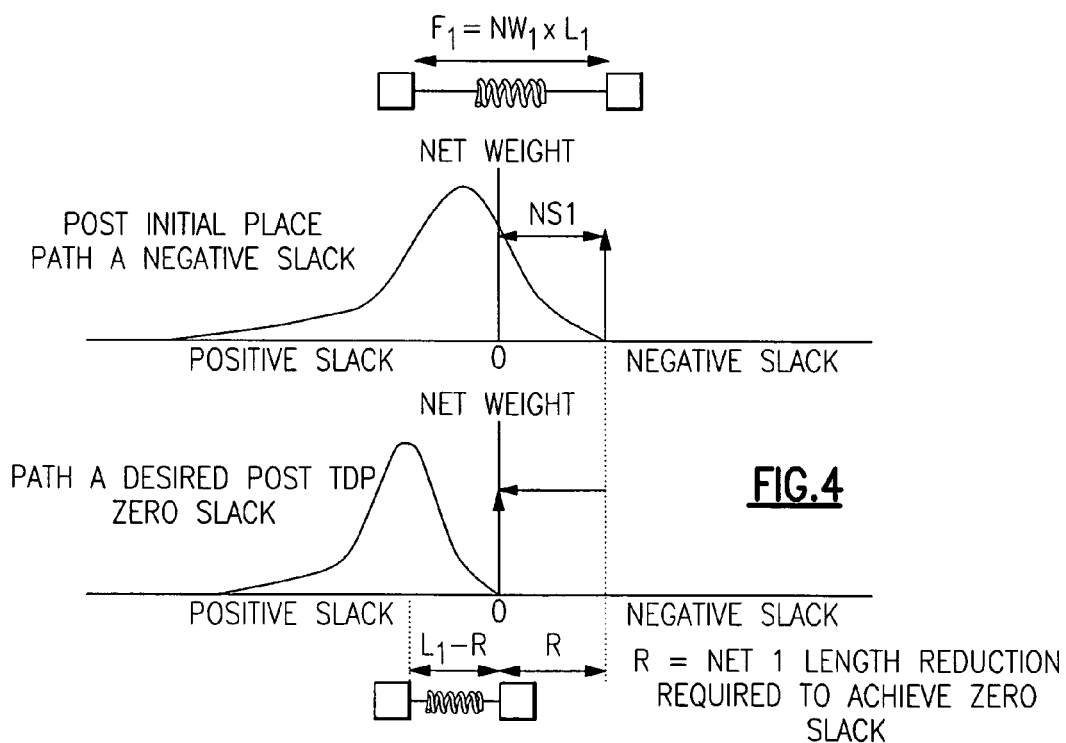
FIG. 4 illustrates a recovered net length R for one Net1 length reduction required to achieve zero slack.

This can be improved. Let's assume that $NW_1$ equals the net weight applied to Net1 in order to achieve a path delay timing value $T_1$. Let's further assume that $T_1$ has a negative slack value of NS1 illustrated in the Post Init Place slack of FIG. 3. In order to achieve timing closure Net1 must recover NS1 ps of its total path interconnect delay. So the desire in the next placement is that the Net1 net length $L_1$ should shorten by the amount needed to recover NS1 ps from the Total Path Delay. Let's call this recovered net length 'R' as defined in FIG. 4 where R=Net1 length reduction required to achieve zero slack.

Assuming for a moment as illustrated in FIG. 5 that the equilibrium force ($NW_1 \times L_1$) for Net1 remained the same for both the initial and subsequent placement; the new force $NW_2(L_1-R)$ equals the old force $NW_1(L_1)$. Thus it is illustrated by the Initial Placement—Equilibrium Point shown for Net1 in FIG. 5 that the new net weight required to shorten Net1 enough to recover NS1 ps and close timing for the path is:

$$NW_2 = NW_1 \times (L_1)/(L_1-R).$$

Interconnect delay is a function of RC loading, which in theory is a function of net length squared.

In actual applications, where buffer insertions and repowering are allowed, interconnect delay is closer to being a linear function of net length. If we make the simplifying assumption that net delay is a linear function of net length, then there is a linear relationship between net delay and net length (FIG. 6); and the equation for the new net weight ($NW_2$) shown above reduces to (FIG. 7):

$$NW_2 = NW_1(\text{Total path net delay})/(\text{Total path net delay}-\text{negative slack value})$$

So, having introduced the new net weight $NW_2$ we also introduce the Zero Wire Load Model (ZWLM) which is a timing model wherein all wire parasitics are removed from consideration in the timing model. As a result the calculated ZWLM path delays and path slacks are primarily based on the synthesized logic delay. So $NW_2$ is impacted by the ZWLM slack value, as described below and the net delay and net length have the relationship illustrated in FIG. 6.

but Total path net delay=*ZWLM* slack value+negative slack value so $NW_2 = NW_1(ZWLM$ slack value+negative slack value$)/(ZWLM$ slack value+negative slack value−negative slack value$)$ or $NW_2 = NW_1(ZWLM$ slack value+negative slack value$)/ZWLM$ slack value or $NW_2 = NW_1(1+(\text{negative slack value}/ZWLM$ slack value$))$ and this is not the same as the current method, where $NW_2$=C (negative slack value).

The current method applies a net weight to all nets in negative slack paths based solely on the amount of negative slack in a path (FIG. 1).

EXAMPLE

If two paths A & B each have negative slack values of minus 500 ps, in the current method, both paths (A & B) will receive the same net weight value.

But suppose that path A had a pre-placement ZWLM slack of +50 ps (FIG. 8), and path2 had a pre-placement ZWLM slack of +5000 ps (FIG. 9).

In order for path A and path B to close timing they must both recover 500 ps worth of net delay.

In path A's case, this recovery amounts to 90% of the path's total net delay adder (500/550=0.9)

In path B's case, this recovery amounts to only 9% of the path's total net delay adder (500/5500=0.09)

Current Method:

Implementing equivalent net weights for the nets in paths A & B implies that these nets will have identical placement priorities in the subsequent placement. Nets in path A—which must (on average) recover 90% of their length, would be treated (prioritized) the same as nets in path B—which must recover (on average) only 10% of their length. This approach does not address their differing placement requirements.

NSRF is our description of a Net Slack Recovery Factor.

The NSRF netweight for Path A, which must recover 90% of its net delay adder, would be set to (50 ps+500 ps)/50 ps=11. (FIG. 10)

Figure 11:
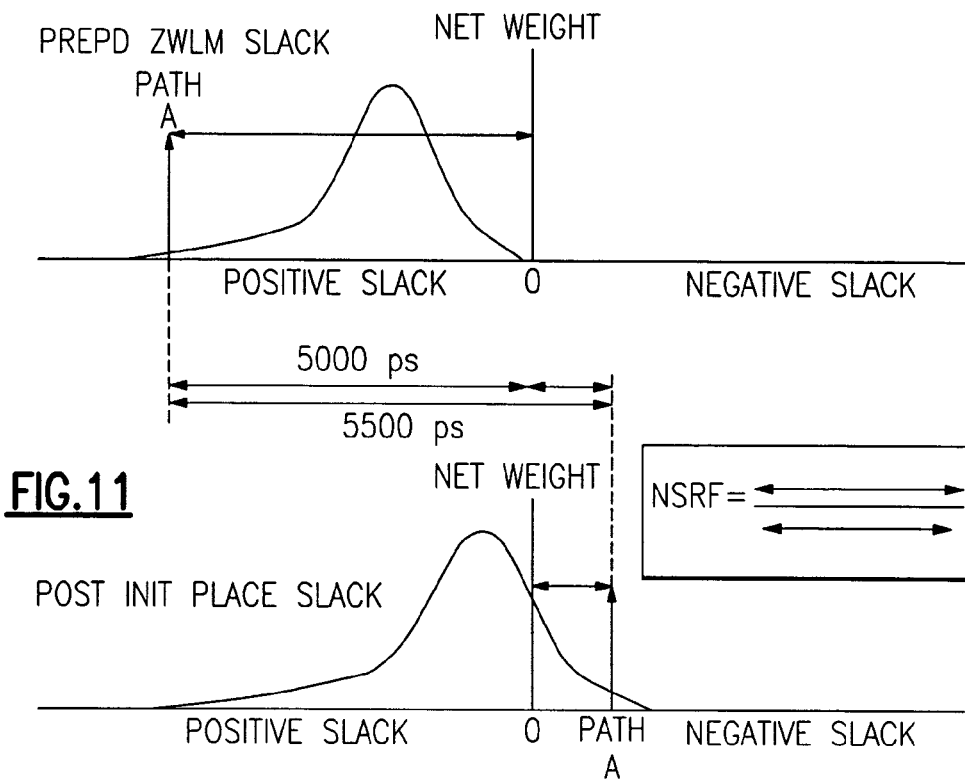
FIG. 11 shows that the NSRF netweight for Path B which must recover only 10% of its net delay adders, is set to 1.1.

The NSRF netweight for Path B, which must recover 10% of its net delay adder, would be set to (5000 ps+500 ps)/5000 ps=1.1 (FIG. 11)

The elevated NSRF net weight of 11 for Path A nets, which must recover 90% of their net delay, correctly prioritizes these nets for placement over the Path B net weights, whose NSRF of 1.1 recognizes their comparatively reduced priority for placement (since they require only a 10% recovery of their net delay in order to achieve timing closure).

Our preferred embodiment: As we noted above, it is an important feature of our preferred embodiment to create placements which are more "timing closure efficient" Timing Driven Placements by implementing our new net weight for negative slack paths and nets. This new weight would not be based on the absolute amount of negative slack in a path, but rather it would be based on the proportion or percentage of the path's total net delay adder that must be recovered in order to achieve timing closure (zero slack).

Figure 12:
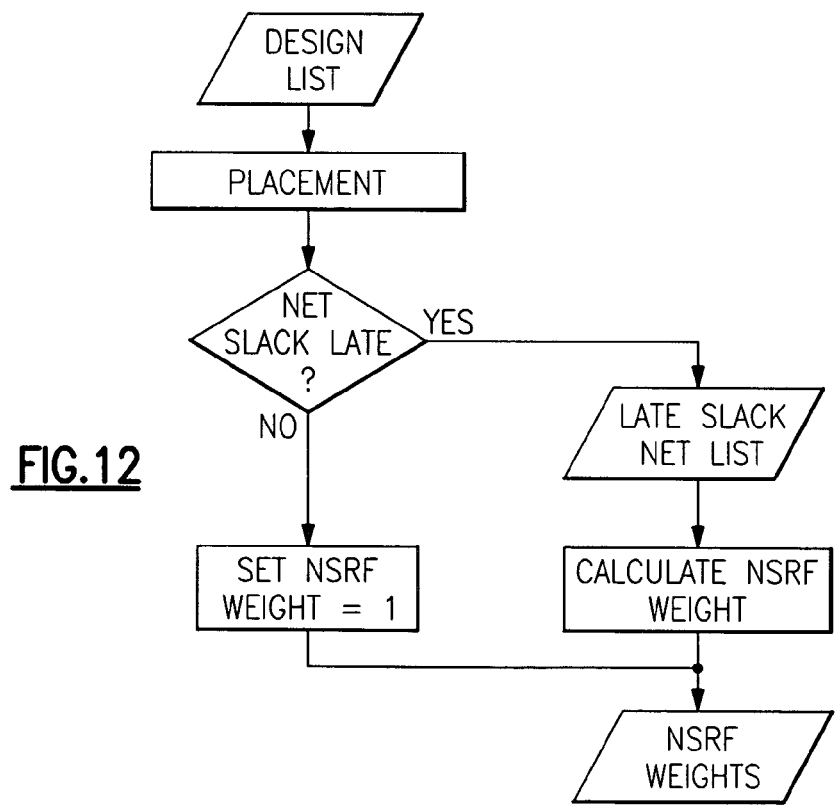
FIG. 12 illustrates an example of the design flow implementing the preferred embodiment of the invention.

Describing our preferred embodiment in more detail, it is preferred that the NSRF net weight be implemented as a net weight multiplier. It is created after an Initial Placement (or any previous placement) has been created (FIG. 12). Timing results are generated based on the Initial Placement. These Timing results are examined and analyzed for timing path timing violations. All paths with timing violations are candidates for the generation of NSRF elevated net weight factors. A list of paths with timing violations is created. For this list of paths, an NSRF net weight factor is created for each net in each of the paths in this list. For paths with no timing violations, the nets in these paths receive an NSRF default value of one.

The NSRF net weight factor would be calculated based on the following equation:

$$NSRF = (ZWLM\ \text{slack value} + \text{negative slack value}) / ZWLM\ \text{slack value} = (1 + (\text{negative slack value} / ZWLM\ \text{slack value}))$$

This NSRF factor would be a multiplier to the remaining factors generated to drive the subsequent placements. These other factors approximate the original placement net weight $NW_1$. As a result the original equation $$NW_2 = NW_1(1 + (\text{negative slack value}/ZWLM\ \text{slack value}))$$

can be re-expressed as $$NW_2 = NW_1 \times NSRF$$

where $NW_1$ is now approximated by the other remaining factors used to drive subsequent placements.

Note: One of the assumptions used to establish the NSRF net weight equation, was the 'force equivalency' between the initial placement and the subsequent placement. This assumption is not entirely accurate because as the Net1 net length ($L_1$) contracts by R, the set of competing nets must expand by the amounts needed to satisfy this change. This expansion is spread out over the entire design's net matrix not just the nets logically adjacent to the Net1. So the expansion may be minimal.

However, even though the expansion may be small, it does change the force on Net1. This occurs because we are not considering changing (lowering) the net weights in the expanding nets to 'force compensate' for the expansion. As a result, the force on Net1 is not the same in the subsequent placement as it was in the initial placement. The force is greater and will tend to prevent Net1 from achieving all of the net contraction created by the NSRF factor.

As a result, we have an additional multiplier factor for negative slack nets that arises from the current method of net weight vs slack mapping which gives each negative slack an additional net weight boost with respect to the expanding nets. This should compensate for the increased force on Net1 on subsequent placements, and allow us to generate the NSRF factor equation based on the supposition of maintaining equal force in Initial and subsequent placements.

This additional multiplier is a modified version of the current method which maps negative slacks linearly into net weights. The slope of the curve for this factor is altered from the current method.

$$NW_2 = NW_1 \times NSRF \times K$$

(Where K is a calculated force generated by a linear mapping of negative slack to net weight).

The capabilities of the present invention can be implemented in software, firmware, hardware or some combination thereof in order to perform the service of this invention.

As one example, one or more aspects of the present invention can be included in a system for chip design and manufacture (e.g., one or more computer program products) having, for instance, computer usable media. The media has embodied therein, for instance, computer readable program code means for providing and facilitating the capabilities of the present invention. The chip resulting as an article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention as specified in the claims.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for implementing improved timing driven placements of elements of a circuit design, comprising creating a list of paths with timing violations with a Negative Slack Recover Factor (NSRF) for each net in each of the timing paths on the list of paths, and then calculating a NSRF net weight factor for use in subsequent placements and also assigning nets in the list of paths with no timing violations a NSRF default value of one, and providing an output list of paths with revised timing driven placement of circuits for a chip design, wherein the NSRF net weight factor is a value equaling (ZWLM slack value+negative slack value)/ZWLM slack value= (1+(negative slack value/ZWLM slack value)), where ZWLM is a Zero Wire Load Model (ZWLM) value of timing and wherein all wire parasitics are removed from consideration in the timing.

2. The method according to claim 1 wherein the calculated NSRF net weight factor is used as a multiplier to remaining factors generated to drive subsequent placements which remaining factors approximate an original placement net weight $NW_1$ wherein as a result a new net weight value can re-express a calculation from an original expression of $NW_2 = NW_1$ (1+(negative slack value/ZWLM slack value)) to a re-expressed statement of $NW_2 = NW_1 \times NSRF$ where $NW_1$ is now approximated by the remaining factors used to drive subsequent placements.

3. The method according to claim 2 wherein a $NW_2$ net weight for negative slack paths is used to enhance timing closure behavior provided by said NSRF (Negative Slack Recover Factor) and not based on the absolute amount of negative slack in a path, but rather it would be based on the proportion or percentage of the path's total net delay adder that must be recovered in order to achieve timing closure (zero slack) to provide more timing closure efficient placements.

4. The method according to claim 3 wherein the NSRF net weight is implemented as a net weight multiplier created after an Initial Placement (or any previous placement) has been created and timing results are generated based on the Initial Placement and examined and analyzed for timing path timing violations.

5. The method according to claim 4 wherein all paths with timing violations are candidates for the generation of NSRF elevated net weight factors.

6. The method according to claim 5 wherein an additional multiplier factor for negative slack nets is used for compensating for increased force on a Net on subsequent placements and which allows generating of a factor for maintaining equal force in Initial and subsequent placements and maps negative slacks linearly into net weights, and wherein $NW_2 = NW_1 \times NSRF \times K$ (Where K is a calculated force generated by a linear mapping of negative slack to net weight).

7. A service used during chip design comprising:
implementing improved timing driven placements of elements of a circuit design
using a list of timing paths after an initial or previous placement has been created, then creating a list of paths with timing violations with a Negative Slack Recover Factor (NSRF) for each net in each of the timing paths on the list of paths, and then calculating a NSRF net weight factor for use in subsequent placements and also assigning nets in the list of paths with no timing violations a NSRF default value of one, and providing an output list of paths with revised timing driven placement of circuits for a chip design, wherein the calculated NSRF net weight factor is used as a multiplier to remaining factors generated to drive subsequent placements which remaining factors approximate an original placement net weight $NW_1$, wherein as a result a new net weight value can re-express a calculation from an original expression of $NW_2 = NW_1 (1+(\text{negative slack value/ZWLM slack value}))$ to a re-expressed statement of $NW_2 = NW_1 \times NSRF$ where $NW_1$ is now approximated by the remaining factors used to drive subsequent placements.

8. The service according to claim 7 wherein a $NW_2$
net weight for negative slack paths is used to enhance timing closure behavior provided by said NSRF (Negative Slack Recover Factor) and not based on the absolute amount of negative slack in a path, but rather it would be based on the proportion or percentage of the path's total net delay adder that must be recovered in order to achieve timing closure (zero slack) to provide more timing closure efficient placements.

9. The service according to claim 8 wherein the NSRF net weight is implemented as a net weight multiplier created after an Initial Placement (or any previous placement) has been created and timing results are generated based on the Initial Placement and examined and analyzed for timing path timing violations.

10. The service according to claim 9 wherein all paths with timing violations are candidates for the generation of NSRF elevated net weight factors.

11. The service according to claim 10 wherein an additional multiplier factor for negative slack nets is used for compensating for increased force on a Net on subsequent placements and which allows generating of a factor for maintaining equal force in Initial and subsequent placements and maps negative slacks linearly into net weights, and wherein $NW_2 = NW_1 \times NSRF \times K$ (Where K is a calculated force).

12. Computer usable media comprising:
computer usable media provided by at least one program storage device readable by a machine, tangibly embodying at least one program of instructions executable by the machine to perform the steps controlled by computer readable program code means for implementing improved timing driven placements of elements of a circuit design using a list of timing paths after an initial or previous placement has been created then creating a list of paths with timing violations with a Negative Slack Recover Factor (NSRF) for each net in each of the timing paths on the list of paths, and then calculating a NSRF net weight factor for use in subsequent placements and also assigning nets in the list of paths with no timing violations a NSRF default value of one, and providing an output list of paths with revised timing driven placement of circuits for a chip design, wherein the calculated NSRF net weight factor is used as a multiplier to remaining factors generated to drive subsequent placements which remaining factors approximate an original placement net weight $NW_1$, wherein as a result a new net weight value can re-express a calculation from an original expression of $NW_2 = NW_1 (1+(\text{negative slack value/ZWLM slack value}))$ to a re-expressed statement of $NW_2 = NW_1 \times NSRF$
where $NW_1$ is now approximated by the remaining factors used to drive subsequent placements.

13. The media according to claim 12 wherein a $NW_2$ net weight for negative slack paths is used to enhance timing closure behavior provided by said NSRF (Negative Slack Recover Factor) and not based on the absolute amount of negative slack in a path, but rather it would be based on the proportion or percentage of the path's total net delay adder that must be recovered in order to achieve timing closure (zero slack) to provide more timing close efficient placements.

14. The media according to claim 13 wherein the NSRF net weight is implemented as a net weight multiplier created after an Initial Placement (or any previous placement) has been created and timing results are generated based on the Initial Placement and examined and analyzed for timing path timing violations, and wherein all paths with timing violations are candidates for the generation of NSRF elevated net weight factors.

15. The media according to claim 14 wherein an additional multiplier factor for negative slack nets is used for compensating for increased force on a Net on subsequent placements and which allows generating of a factor for maintaining equal force in Initial and subsequent placements and maps negative slacks linearly into net weights, and wherein $NW_2 = NW_1 \times NSRF \times K$ (Where K is a calculated force generated by a linear mapping of negative slack to net weight ).

16. The media according to claim 12 wherein the media results in an article of manufacture comprising a chip design included as part of a computer system.

* * * * *